United States Patent
Wang et al.

(10) Patent No.: US 10,656,169 B2
(45) Date of Patent: May 19, 2020

(54) METHOD AND APPARATUS FOR REDUCING CARRYOVER OF REAGENTS AND SAMPLES IN ANALYTICAL TESTING

(71) Applicant: Siemens Healthcare Diagnostics Inc., Tarrytown, NY (US)

(72) Inventors: Jianfang Wang, Wilmington, DE (US); Mark Sprenkle, Newark, DE (US); Colin Ingersoll, Wilmington, DE (US); Stephen Frye, Bear, DE (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 166 days.

(21) Appl. No.: 15/311,120

(22) PCT Filed: May 26, 2015

(86) PCT No.: PCT/US2015/032414
§ 371 (c)(1),
(2) Date: Nov. 14, 2016

(87) PCT Pub. No.: WO2015/183800
PCT Pub. Date: Dec. 3, 2015

(65) Prior Publication Data
US 2017/0082646 A1 Mar. 23, 2017

Related U.S. Application Data

(60) Provisional application No. 62/004,408, filed on May 29, 2014.

(51) Int. Cl.
*G01N 35/00* (2006.01)
*G01N 35/04* (2006.01)

(52) U.S. Cl.
CPC ... *G01N 35/0092* (2013.01); *G01N 35/00663* (2013.01); *G01N 2035/0094* (2013.01);
(Continued)

(58) Field of Classification Search
CPC ......... G01N 35/0092; G01N 35/00663; G01N 2035/00356; G01N 2035/00673; G01N 2035/0094; G01N 2035/0444
See application file for complete search history.

(56) References Cited

U.S. PATENT DOCUMENTS 4,166,095 A * 8/1979 Kling ................. G01N 35/0092
422/67
4,908,320 A 3/1990 Zakowski
(Continued)

FOREIGN PATENT DOCUMENTS

JP 2004/101541 A 4/2004
WO 1993/020440 A1 10/1993

OTHER PUBLICATIONS

PCT International Search Report and Written Opinion dated Aug. 17, 2015 (8 Pages).
(Continued)

*Primary Examiner* — Benjamin R Whatley

(57) ABSTRACT

A method of reducing carryover of liquids, such as reagent and/or samples, in analytical or immunoassay testing. The method includes providing an incubation member including a plurality of reaction vessels thereon, pre-assigning certain ones of the reaction vessels in the incubation member for only first test types or certain reagent types for all test lots; and pre-assigning other ones of a second subset of reaction vessels in the incubation member for only second test types for all test lots. By ensuring no mixing of potentially interfering test types or reagent types from test lot to test lot, sample and/or reagent carryover is mitigated. Testing apparatus adapted to carry out the methods are provided, as are other aspects.

6 Claims, 4 Drawing Sheets

(52) U.S. Cl.
CPC .............. *G01N 2035/00356* (2013.01); *G01N 2035/00673* (2013.01); *G01N 2035/0444* (2013.01)

(56) References Cited

U.S. PATENT DOCUMENTS

| | | | |
|---|---|---|---|
| 5,320,966 A * | 6/1994 | Mitsumaki | G01N 35/0092 422/116 |
| 5,380,487 A | 1/1995 | Choperena et al. | |
| 5,885,529 A | 3/1999 | Babson et al. | |
| 2003/0054557 A1* | 3/2003 | Devlin, Sr. | G01N 35/0092 436/50 |
| 2004/0053414 A1* | 3/2004 | Devlin, Sr. | G01N 35/0092 436/43 |
| 2005/0129576 A1* | 6/2005 | Oonuma | G01N 35/0092 422/64 |
| 2008/0102528 A1 | 5/2008 | Xu et al. | |
| 2012/0087830 A1* | 4/2012 | Wakamiya | G01N 35/0092 422/67 |

OTHER PUBLICATIONS

Extended EP Search Report dated May 30, 2017 of corresponding European Application No. 15800543.9, 4 Pages.

* cited by examiner

METHOD AND APPARATUS FOR REDUCING CARRYOVER OF REAGENTS AND SAMPLES IN ANALYTICAL TESTING

RELATED APPLICATION

The present application claims priority to U.S. Provisional Patent Application No. 62/004,408 filed on May 29, 2014, and entitled "METHOD AND APPARATUS FOR REDUCING CARRYOVER OF REAGENTS AND SAMPLES IN ANALYTICAL TESTING," the disclosure of which is hereby incorporated by reference herein in its entirety for all purposes.

FIELD

The present invention relates generally to testing apparatus adapted to measure one or more characteristics of a test sample.

BACKGROUND

There are hundreds of reaction vessels (cuvettes) used on common high-throughput testing apparatus (e.g., clinical analyzers). A patient sample, one or more reagents, and possibly other constituents are delivered into each of the cuvettes, after which a chemical reaction between the one or more reagents and sample takes place in the cuvettes. The mixture of samples, one or more reagents and possibly other constituents undergo incubation and are then read with a read device to determine a characteristic of interest (e.g., an amount of nucleic acid present) in the sample. In some embodiments, where magnetic beads are used, the beads may undergo washing and are subjected to an elution buffer prior to the read. The read device may be a fluorescent or color read device, for example. In some testing apparatus, the cuvettes are automatically washed and then reused.

Although reuse of cuvettes is desirable from a cost standpoint, residual reagent and/or residual sample from a previous test (hereinafter a "donor test") may be present in a washed cuvette. These residual reagent and/or sample from the "donor test" may possibly interfere with the results of the current test (hereinafter the "recipient test") when using the washed and reused cuvette. To minimize carryover, the cuvettes are subjected to substantial wash routines in current testing apparatus.

Generally there are two types of cuvette wash routines currently used. The first type of wash routine (hereinafter "default wash") cleans cuvettes whenever a cuvette is going to be used or when the analyzer has been idle for a certain period of time. There are at least three steps for the default wash that may include: 1) wash with a unique detergent (e.g., a NaOH solution); 2) rinse with water; and 3) drying of the cuvette.

Some reagents are quite difficult to clean off using the default wash, and thus a special type of wash routine (hereinafter "special wash") may be used to clean cuvettes with special detergents (e.g., acids) wherein the special wash includes: 1) wash with an acid; 2) rinse with water; and 3) drying of the cuvette. Typically, the special wash is followed by a default wash. Sometimes several special wash routines and special detergents are used.

It may take several minutes to complete one wash routine (either default or special) due to system scheduling. For example, if an analyzer has 220 cuvettes resident on board and the system cycle time is three seconds per test, then it will takes about 11 minutes to complete one full wash routine of all cuvettes. It may take 22 minutes or more to clean the cuvettes, if a special wash is performed.

Thus, it should be recognized that these wash routines cause: 1) significant reduction of system throughput, 2) cause significant delay of patient sample testing, and 3) cause delay in obtaining and reporting of the sample results.

One conventional solution to reduce carryover in test apparatus (e.g., clinical analyzers) that use disposable cuvettes is by providing one new cuvette per test. A cuvette loader sub-system may be incorporated to load a new cuvette to the testing apparatus, or other apparatus may be incorporated into the testing apparatus in order to make a new cuvette on the testing apparatus.

Another conventional solution to reduce carryover includes providing in the testing apparatus, two or more identical hardware modules. The donor tests are tested on one module and the recipient tested on the other module.

Although these current methods may mitigate reagent and sample carryover, they may substantially increase system complexity, overall cost, and operating cost. Such complexity may cause reliability issues for the testing apparatus.

Thus, in accordance with one aspect, improved apparatus and methods configured and operable to reduce or eliminate reagent and/or sample carryover are desired.

SUMMARY

In accordance with a first aspect, a method of reducing carryover of reagents in analytical testing is provided. The method includes providing an incubation member including receptacles including a first subset of reaction vessels and a second subset of reaction vessels, dispensing a first reagent in only the first subset of the reaction vessels for all tests of a first test type that include addition of the first reagent, and dispensing a second reagent in only the second subset of the reaction vessels for all tests of a second test type that include the addition of the second reagent.

In accordance with another aspect, a method of reducing carryover of liquids in analytical testing is provided. The method includes providing an incubation member including a plurality of reaction vessels thereon, pre-assigning a first subset of the reaction vessels for only a first test type for all test lots, and pre-assigning a second subset of the reaction vessels for only a second test type for all test lots, the first test type being different than the second test type.

In accordance with another aspect, a testing apparatus is provided. The testing apparatus includes an incubation member including reaction vessels thereon, a controller operable to execute a selection routine in order to: pre-assign a first subset of the reaction vessels on the incubation member to carry out all tests of a first test type including a first reagent type, and pre-assign a second subset of the reaction vessels to carry out all tests of a second test type including a second reagent type, and a drive system operable to move the incubation member responsive to the selection routine to dispense the first reagent type only in the first subset of reaction vessels, and to dispense the second reagent type only in the second subset of reaction vessels.

BRIEF DESCRIPTION OF THE DRAWINGS

Embodiments of the invention will be better understood by referring to the description taken in conjunction with the following drawings. The drawings are not necessarily drawn to scale, and are not intended to limit the scope of embodiments of the invention in any way. Like numerals denote like elements.

DESCRIPTION

Figure 1:
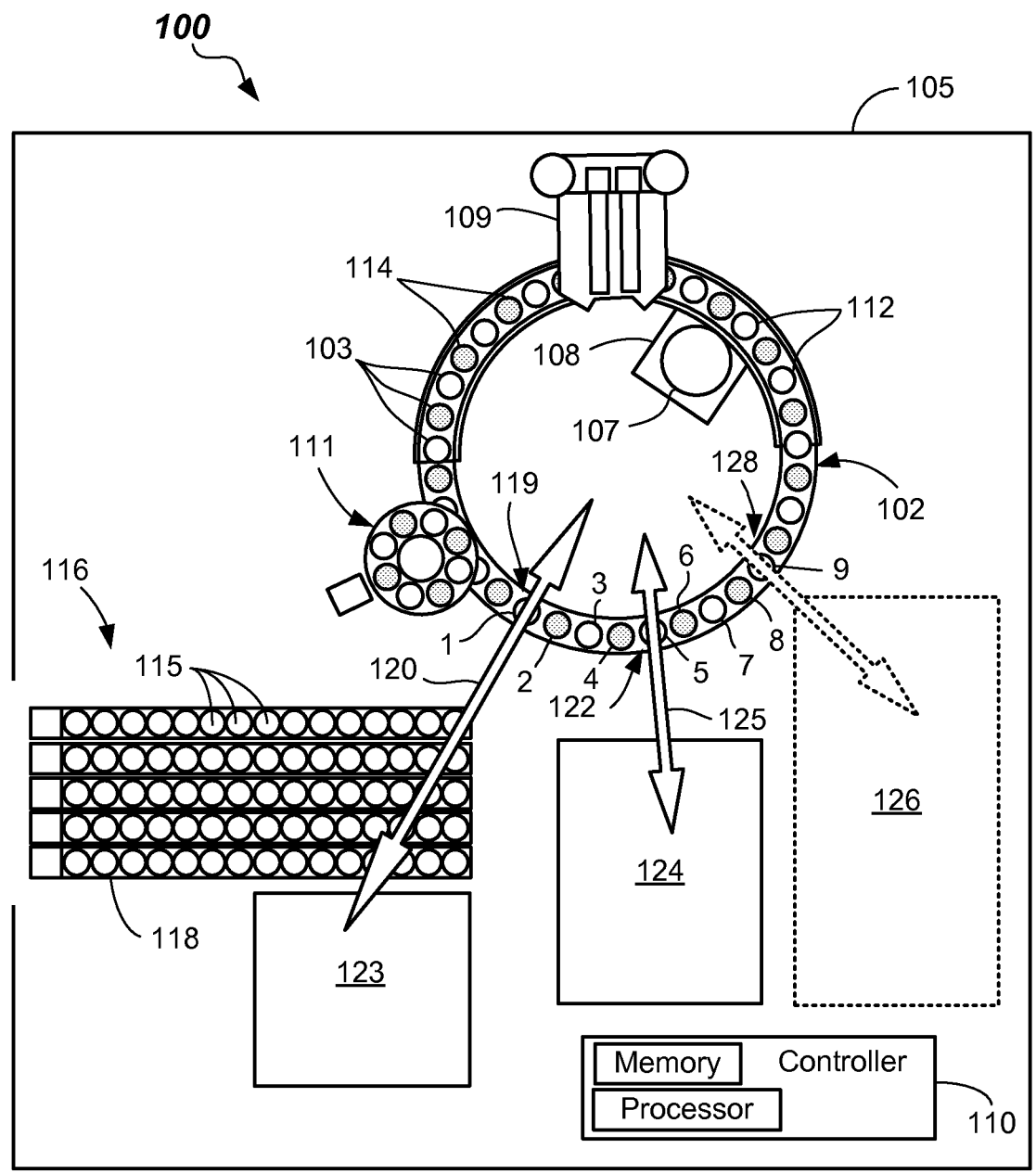
FIG. 1 illustrates a top view schematic diagram of a testing apparatus including even and odd cuvette pre-assignments according to one or more embodiments.

In accordance with one or more embodiments of the invention, a method of reducing reagent carryover in analytical testing (e.g., in clinical analyzers or immunoassay instruments) is provided. The method of reducing carryover of a reagent includes providing an incubation member including receptacles containing a first subset of reaction vessels and a second subset of reaction vessels. The first subset being different than the second subset. The first subset of reaction vessels is used for all tests of a first test type that include addition of a first reagent, and the second subset of reaction vessels is used for all tests of a second test type that include the addition of a second reagent. For testing apparatus (e.g., clinical analyzers and immunoassay instruments) adapted to carry out additional test types using an additional reagent type, the number of subsets of reaction vessels may be increased to correspond to the number of reagents in some embodiments. In other embodiments, certain reagents are predetermined to reside in certain ones of the receptacles (e.g., odd numbered receptacles), while other reagents are predetermined to reside in other ones of the receptacles (e.g., even numbered receptacles). Reagents which may interfere with (e.g., act as an analyte of) another reagent are never provided in the same subset. In this way, for testing apparatus using multiple reagents, each subset of reaction vessels only receives non-interfering reagent(s) within test lot, but also from test lot to test lot. Thus, the carryover of reagent is minimized.

In some embodiments, all the tests of the first test type are run in certain pre-assigned ones of the reaction vessels (e.g., reaction vessels in odd numbered receptacles) of the incubation member, and all the tests of the second test type are run in other pre-assigned ones of the reaction vessels of the incubation member (e.g., reaction vessels in even numbered receptacles vessels).

In other embodiments, all tests of the first test type including a reagent of a first reagent type are run on reaction vessels in a first pattern on the incubation member, while all tests of the second test type including a reagent of a second reagent type are run in reaction vessels in a second pattern on the incubation member. For additional reagent types, additional subsets of reaction vessels in patterns (third subset, fourth subset, fifth subset, and so on) may be implemented. The patterns may take any suitable form as will be described herein. By conducting tests of a first test type in a first subset of reaction vessels and a second test type in another subset of reaction vessels, a first reagent of a first reagent type is only present in the first subset of reaction vessels and never intermingles with the a second reagent of a second reagent type. Thus, reagent carryover is minimized or eliminated.

As should be recognized, in some embodiments, more than one reagent type may be dispensed into the first subset of reaction vessels, and more than one reagent type may be dispensed into the second subset of reaction vessels, as long as any interfering reagent types are only placed in opposite subsets.

These and other embodiments of the invention are described with reference to FIGS. 1-4 herein.

FIG. 1 illustrates a testing apparatus 100 for carrying out analytical chemistry or immunoassay testing using the methods according to embodiments of the invention. The testing carried out by the testing apparatus 100 may be for determining a concentration of a chemical component, a specific protein, toxic component, therapeutic, or other analyte or other substance (e.g., ammonia, carbon dioxide, nucleic acid, glucose oxidase, hemoglobin A1c, bilirubin (direct or total), albumin, microalbumin, magnesium, lipase, creatinine, cholesterol (Chol), HDL cholesterol, LDL cholesterol, calcium (CPC), iron (IRON), Triglycerides (TRIG), Lipase (LIP), unsaturated iron binding capacity (UIBC), Immunoglobulin M (IGM), aspartate aminotransferase (AST), alanine aminotransferase (ALT), lactate dehydrogenase (LD), creatine kinase (CK), Amylase (AMY), alkaline phosphatase (AMP), alkaline phosphatase enzyme (ALP), Acid Phosphatase (ACP) (ACP), potassium (K), sodium (Na), chloride (ISE), C-reactive protein (CRP), Antistreptolysin O, Apolipoprotein A1, Barbituates, Benzodiazepines, Methadone, Opiates, Tricyclic Antidepressants, Tobramycin (TOB), Digoxin (DIG), Lithium, Phenabarbital, Transferrin (TRF), Valproic Acid, Vancomycin (VANC), or the like) in a liquid or sample of bodily fluid from a patient.

The testing apparatus 100 includes an incubation member 102 including a plurality of receptacles 103 formed therein. The number of receptacles 103 may number between about 2 to about 500, between about 100 and 500, and about 220 in some embodiments. However, other numbers of receptacles 103 on the incubation member 102 may be used. Reaction vessels may be received in the receptacles 103 of the incubation member 102. In some embodiments, all of the receptacles 103 contain reaction vessels. Reaction vessels may be cuvettes or other like clear containers capable of receiving and holding samples, reagents, and possibly other components during the incubation process carried out in the testing apparatus 100.

In one or more embodiments, the incubation member 102 may be an annular ring including the receptacles 103 arranged in a circle thereon. Incubation member 102 may be rotatable about a central axis of the incubation member 102 relative to a housing 105 of the testing apparatus 100. Rotation may be accomplished by any suitable means, such as by a drive system including a gear 107 that engages with a part the incubation member 102 and rotates the incubation member 102. A drive motor 108 may be coupled to the gear 107 and rotate the incubation member 102 responsive to control signals from a controller 110. The rotation may be in either rotational direction (CW or CCW) and may precisely position the incubation member 102 and respective reaction vessels at desired locations for various operations, such as dispensing patient sample, dispensing one or more reagents, dispensing buffer, dispensing diluent, adding magnetic particles, and/or adding other components. The rotation may also move specific reaction vessels to a wash station 109 for performing operations such as default or special washes thereon. Likewise, the rotation may move specific reaction vessels to a read device 111 to carry out a read operation after incubation. Other drive systems may be used to position the incubation member 102 as desired for the specific processing taking place.

The reaction vessels in the incubation member 102 may include at least a first subset of reaction vessels 112 and a second subset of reaction vessels 114. "Subset" as used herein means a set of 2 or more vessels that is less than the amount of all of the available reaction vessels in the incubation member 102. Although the reaction vessels may be identical in structure and materials, in one embodiment, the first subset of reaction vessels 112 is designated and thus pre-assigned to receive a first reagent, and a second subset of reaction vessels 114 is designated and pre-assigned to receive a second reagent, wherein the first and second reagents are different reagent types. To illustrate the differences from the prior art, the first subset of reaction vessels 112 are shown as white-filled circles, while the second subset of reaction vessels 114 are shown as grey-filled circles in FIG. 1.

In the depicted embodiment, the first subset of reaction vessels 112 are pre-assigned and recorded in memory of the controller 110 as being designated to be contained only the odd numbered receptacles (e.g., 1, 3, 5, 7, 9, and so on), while the second subset of reaction vessels 114 are pre-assigned and recorded in memory of the controller 110 as being designated to be contained only in the even numbered receptacles (e.g., 2, 4, 6, 8, and so on). The location of each receptacle 103, and thus the specific reaction vessel, and patient sample and test being carried out therein is known by the controller 110 at all times during incubation and processing. The location of each position of the incubation member may be known by proper calibration and setup and/or by receiving rotational feedback from the drive motor 108 or an encoder or the like (not shown). Thus, the positions of the odd and even numbered receptacles 103 and the samples and tests being conducted therein are known by the controller 110 at all times.

In operation, samples 115 from patients are aspirated from a sample receiving location 116 of the testing apparatus 100. The sample receiving location 116 may contain one or more sample racks 118 thereon. Sample racks 118 may contain sample containers (e.g., blood collection tubes), which include the samples 115. Aspiration and dispensing of sample 115 may be accomplished by a conventional probe and aspiration and dispensing system (not shown). For example, aspirating and dispensing systems, which may be used with the present invention, are described in U.S. Pat. Nos. 7,867,769; 7,634,378; 7,477,997; 7,186,378; 7,150,190; and 6,370,942, which are hereby incorporated by reference herein.

The line of action between the sample receiving location 116 and a sample dispense location 119 is designated as first arrow 120. One by one, samples 115, which may be from a multitude of patients, may be aspirated and dispensed into various reaction vessels contained in the receptacles 103. The test types to be run on each sample 115 is known by controller 110. A readable code on each sample container in the sample rack 118 (e.g., a bar code) may be used to identify the sample 115 by patient and by test type to be conducted.

Depending on the test type and the reagent type to be used for that test type, either an odd receptacle included in the first subset of reaction vessels 112 or an even receptacle included in the second subset of reaction vessels 114 may be selected. The type of test and/or reagent type may be pre-assigned to be in only certain ones of the reaction vessels (e.g., in only the first subset of reaction vessels 112, or only in the second subset of reaction vessels 114). For example, in some embodiments, a first reagent type will always be pre-assigned to be placed in one of a reaction vessel in an even or an odd receptacle 103 (i.e., pre-assigned to an odd reaction vessel). A second reagent type that interferes with the first reagent type will always be pre-assigned to be placed in the other one of the reaction vessels in the even or an odd receptacle 103 (i.e., in an even reaction vessel). Odd reaction vessel as used herein means that the reaction vessel is placed in an odd numbered receptacle 103. Even reaction vessel as used herein means that the reaction vessel is placed in an even numbered receptacle 103.

Table 1 below illustrates examples of tests and reagent types and their predetermined designation (pre-assignment) that may be stored in memory of the controller 110, as including even or odd receptacle 103 placements.

TABLE 1

Example of Odd and Even Receptacle Placement

| Test Type | Reagent Type(s) | Odd or Even |
|---|---|---|
| Lipase | chromogenic lipase substrate, DGGMR | Odd |
| TRIG | Lipase | Even |
| Creatinine | Picric acid & Buffer | Odd |
| Calcium | o-Cresolphthalein Complexone & Buffer | Even |
| Albumin | Bromocresol Green | Odd |
| Microalbumin | Antihuman albumin (goat) | Even |

As should be understood, by always running tests that include certain reagents and/or buffers only in reaction vessels located only in certain pre-assigned receptacles 103 (e.g., odd or even), the carryover of other interfering reagent types may be minimized or eliminated. Special care should be taken to ensure that any reagent type that may be subsequently dispensed, that may possibly act as an analyte or otherwise affect another test should always be dispensed into only pre-assigned reaction vessels (e.g., even and odd reaction vessels).

For example, some substances may alter the measurable concentration of the analyte or otherwise alter antibody binding. This may potentially result in immunoassay or analyte interference. Interfering substances may lead to falsely elevated or falsely low analyte concentration in one or more testing apparatus 100 (clinical analysis or immunoassay). Examples of interfering test sets are TRIG/LIP, ACP/TOB, VANC/TRF, DIG/IGM, and IRON/UPRO, wherein the first listed of the test set may act as an analyte in second test listed, as discussed in more detail below. This is not all inclusive list, and residue of many different reagent types may acts as an analyte or otherwise interfere with other reagent types. Such interfering tests and interfering reagents should not be conducted or placed in a same reaction vessel. Placing potentially interfering tests in odd or even numbered reaction vessels may help mitigate this type of interference.

After the sample dispense, the incubation member 102 may be moved (e.g., rotated) to the reagent receiving location 122. A new tip may be placed on the sample dispense probe from a tip storage 123. A first reagent type associated with the ordered test type to be conducted for that sample 115 may be added from reagent supply 124. Other components may be added as well for test types that include multiple reagents, buffers, acids, bases, or other constituents from an auxiliary supply 126. Reagent addition may be by a pipetting operation or the like at the reagent receiving location 122 and may be conducted using an aspiration and dispensing system like described above and a reagent probe moving along line of action 125.

Reagent supply 124 may include up to a hundred or more different reagent types to allow the testing apparatus to carry out a large number of test types. Reagent supply 124 may include reagents housed in reagent packs situated on a carousel, for example. The number of possible reagents types is only limited by space concerns. Thus, a multitude of different test types may be run on the testing apparatus 100. After the sample 115 is dispensed or after the one or more reagents are dispensed into the reaction vessel, additional diluent may be added in some embodiments from a diluent dispensing system (not shown). Diluent may be deionized water, for example. Additionally, the incubation member 102 may be rotated to a supplemental dispense location 128 wherein certain acids, bases, magnetic beads, or other buffer materials may be added.

The resultant mixture is allowed to react (incubate) for a specified period of time. The reaction may take place in a heated environment surrounding the incubation member 102 in some embodiments. After the specified time has elapsed, a wash operation may take place at wash station 109, if magnetic beads are used, and an elution buffer may then be added to unbind the component of interest from the previously added magnetic beads. In some embodiments, a second reagent or additive may be added before the elution buffer. After the sample of interest has completed elution, it may be read at read device 111. The read device 111 may be colorimetric, fluorescent, gravimetric, ion selective, titrimetric, or atomic absorption depending upon the type of test being conducted. From the read device 111 the relative concentration of the component of interest may be determined.

In some cases (e.g., in some clinical analyzers), magnetic beads may not be used. In this instance, the cocktail of sample, reagent, and possibly diluent, and/or buffer and/or other additive is simply sent to the read device 111 after the designated incubation period for that test type. Again, read device 111 determines the relative concentration of the component of interest, which is then reported out, such as by transmission to a Laboratory Information System (LIS).

To illustrate a first embodiment of the invention, a simple example is provided where only two interfering reagent types are used. In operation, the controller 110 may execute a vessel selection routine in software in order to pre-assign and dedicate the first subset of the reaction vessels 112 to carry out all tests of a first test type (e.g., triglyceride (TRIG)) including addition of a first reagent (e.g., a TRIG reagent, such as Lipase), and pre-assign and dedicate the second subset of the reaction vessels 114 to carry out all tests of a second test type (e.g., Lipase (LIP)) including addition of a second reagent (e.g., a Lipase reagent, such as chromogenic lipase substrate, DGGMR). In this example, all TRIG testing may take place in the first subset of the reaction vessels 112 (e.g., the odd reaction vessels), whereas all LIP testing may take place in the in the second subset of the reaction vessels 114 (e.g., the even reaction vessels). In this example, the TRIG reagent may act as an analyte for the LIP testing, and thus any TRIG reagent residue carryover should be avoided. Providing the TRIG reagent only in the first subset of the reaction vessels 112 and the LIP reagent only in the second subset of the reaction vessels 114 minimizes or eliminates this carryover possibility. The even/odd may be switched in some embodiments. These pre-assigned reaction vessels for the first and second subsets 112, 114 are assigned for all test lots, so that from test lot to test lot, the same reaction vessels are used for the same test types.

Certainly, most real-world applications of testing apparatus 100 will not be relegated to carrying out only two interfering tests, but may include may more test types and reagent types, some of which may be possibly interfering. For example, some testing apparatus 100 may have the capacity to conduct five or more, ten or more, 20 or more, 50 or more, or even up to 100 or more test types. In these embodiments, certain test types may be pre-assigned and relegated to be conducted only in a first subset of the reaction vessels 112 (e.g., odd numbered reaction vessels) and other test types may be relegated to a second subset of the reaction vessels 114 (e.g., even numbered reaction vessels). Thus, where more than two interfering regents are present, reagent carryover may be mitigated.

Other examples where a donor reagent (first test listed) may act as an analyte for a recipient test (last test listed) are:
  Acid Phosphatase (ACP) and Tobramycin (TOB) (e.g., ACP/TOB test set),
  Vancomycin (VANC) and Transferrin (TRF) (e.g., VANC/TRF test set),
  Digoxin (DIG) and Immunoglobulin M (IGM) (e.g., DIG/IGM test set), and
  Iron (IRON) and Total Protein (UPRO) (e.g., IRON/UPRO test set).

One of each of the afore-mentioned tests should be conducted only in the first subset of the reaction vessels 112 (e.g., odd numbered reaction vessels), while the other one or each interfering test set may be relegated to a second subset of the reaction vessels 114 (e.g., even numbered reaction vessels).

In example embodiments where the testing apparatus 100 is set up for testing with using more than two types of reagents (e.g., 3-100 reagents), then certain test types and reagent use may be carried out in the first subset of the reaction vessels 112 (e.g., the odd numbered reaction vessels) whereas certain other test types and reagent use may be carried out in in the second subset of the reaction vessels 114 (e.g., the even numbered reaction vessels). For example, certain test types may be always carried out in one subset, whereas certain other test types may always be carried out in another different subset. For example, a first subset of reaction vessels 112 (e.g., in odd numbered reaction vessels) may be used to carry out tests for ACP, VANC, DIG, and IRON, whereas a second subset of reaction vessels 114 (e.g., in even numbered reaction vessels) may be used to carry out tests for TOB, TRF, IGM, and UPRO.

If a large amount of tests are run on a particular testing apparatus 100, a third, a fourth, or a fifth subset or more of the reaction vessels may be designated and used for selected test types. The subsets of the reaction vessels may be oriented in any pattern, such as a staggered as shown in Table 2 below. Staggered placement may be coordinated with the number of different types that are running. For example, if three tests are running, the allotted receptacles may be designated every three receptacles; if four, every four receptacles, if five, every five receptacles, and so on. From the running of one test lot (e.g., one full run of the incubation member 102) to the next test lot, the designated receptacles for each test type may remain the same.

TABLE 2

Example of Staggered Receptacle Placement For Four Tests

| Test Type | Receptacle Placement |
| --- | --- |
| TRIG | 1, 5, 9, 13, etc. |
| Lipase | 2, 6, 10, 14, etc. |
| ACP | 3, 7, 11, 15, etc. |
| TOB | 4, 8, 12, 16, etc. |

Reagent Carryover Example

An example of mitigation of reagent carryover will now be described. In this example, method A (e.g., TRIG) is the donor method, and method B (e.g., LIP) is the recipient method. $S_A$ stands for the sample of method A, $R_A$ the reagent of method A, $S_B$ stands for the sample of method B, and $R_B$ stands for the reagent of method B.

When the testing apparatus 100 (e.g., clinical analyzer) runs method A in a first reaction vessel (e.g., cuvette X), the following reaction of Eqn. 1 takes place:

$$S_A + R_A \rightarrow \text{Detection signal of product of } S_A \text{ and } R_A \qquad \text{Eqn. 1}$$

After the method A (e.g., triglycerides) testing, the cuvette X is cleaned by a wash routine and is ready for the next test. If the next test is method B, any residual of $R_A$ ($RR_A$) still present in the cuvette X may act as the sample analyte of method B. In particular, the following reactions take place in Eqn. 2 and 3:

$$S_B + R_B \rightarrow \text{Detection signal of product of } S_B \text{ and } R_B \qquad \text{Eqn. 2}$$

$$RR_A + R_B \rightarrow \text{Detection signal of product of } S_B \text{ and } R_B \qquad \text{Eqn. 3}$$

Because $RR_A$ acts as the sample analyte in method B wherein the reaction of $RR_A$ with $R_B$ is detected as signal product of $S_B$ and $R_B$, a false result can be reported in method B, as the reported concentration is the sum of the detection signal of Eqn. 2 and Eqn. 3. Thus, always ensuring that both $R_A$ and $R_B$ are never in the same reaction vessel minimizes reagent carryover according to one or more embodiments of the invention.

Figure 2:
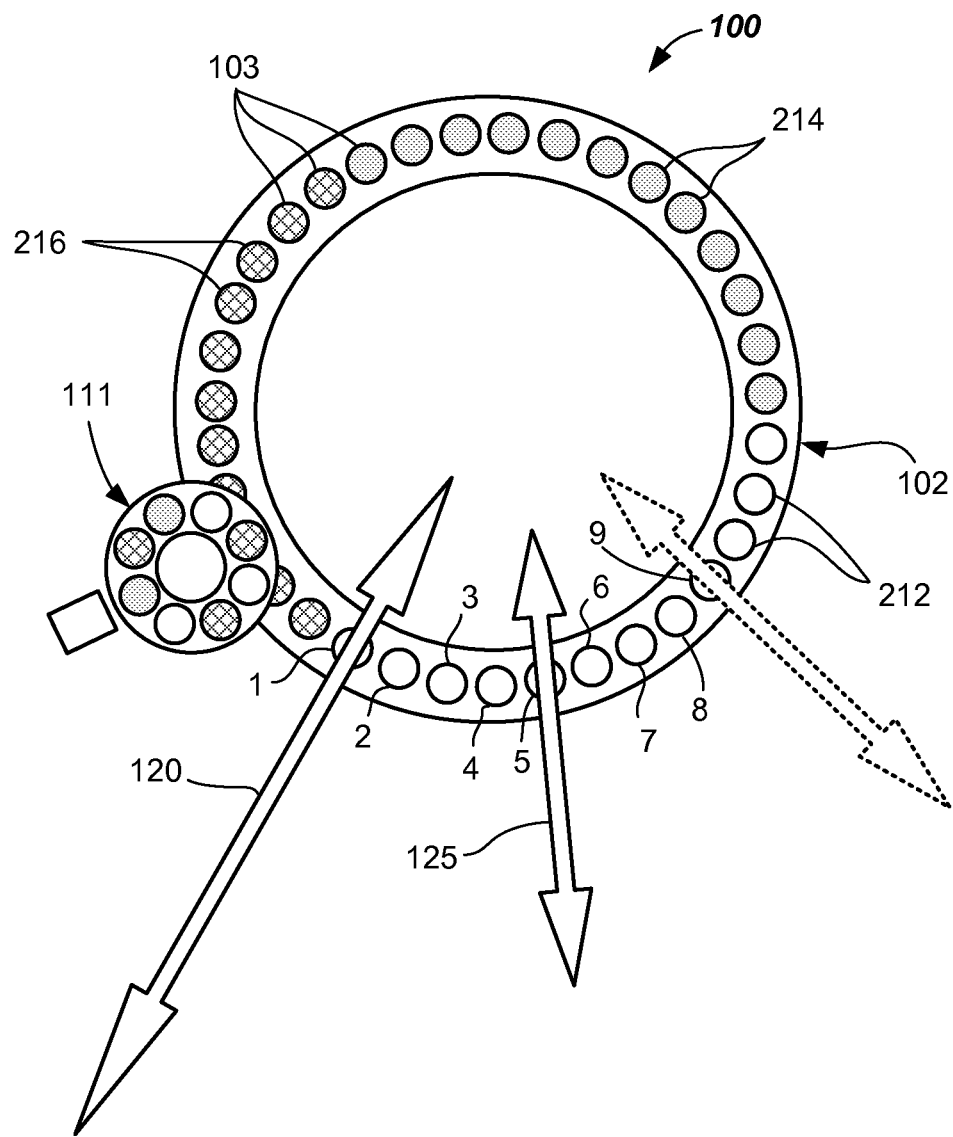
FIG. 2 illustrates a top view schematic diagram of a portion of a testing apparatus including reaction vessels that are arranged in a pattern according to one or more embodiments.

In another embodiment, as is shown in FIG. 2, certain test types of the testing apparatus 100 including a first reagent type may be carried out in the first subset of the reaction vessels 212 in a first pattern, whereas certain other test types including another reagent type may be carried out in a second subset of the reaction vessels 214 in a second pattern. For example, the first pattern may include the first subset of the reaction vessels 212 that may be a first percentage (e.g., first approx. 33%) of the available receptacles 103 arranged side-by-side about incubation member 102. A second pattern may include the second subset of the reaction vessels 214 that may be a second percentage (e.g., second approx. 33%) of the available receptacles 103 arranged side-by-side about incubation member 102 next to the first percentage. A third pattern may include a third subset of the reaction vessels 216 that may be a third percentage (e.g., third approx. 33%) of the available receptacles 103 arranged side-by-side about incubation member 102 next to the first percentage and second percentage. Other arrangement patterns may be used. For example, four or more patterns may be provided. The percentages may also be unequal in some embodiments. For example, the percentages and patterns may be pre-assigned to meet the approximate percentage of tests historically running on that particular testing apparatus 100. Other receptacle patterns may be used.

For example, rather than use even and odd reaction vessels, or percentages, certain test types may be allotted to every third one, or every fourth one, or every fifth one, and so on, of the reaction vessels in the receptacles 103. The pre-assigned patterns may be pre-programmed into a selection routine and stored in memory of the controller 110. Thus, when a sample 115 includes a test order to carry out a specified test on the testing apparatus 100 is received at the sample receiving location 116, then the sample 115 is dispensed along with the one or more reagents, and possibly diluent, buffer, and/or other components into the pre-assigned reaction vessels in receptacles 103 for that test type. If there are multiple reaction vessels pre-assigned for that test type, then the reaction vessels in those receptacles 103 may be filled in any suitable order, such as by dispensing to the closest reaction vessel.

As should be recognized, more than one test type and reagent type may be assigned to a respective reaction vessel in a receptacle 103, as long as the respective reagents are "non-interfering." "Non-interfering" as used herein means that one reagent type does not act as an analyte to another test type or otherwise affect the outcome of the test. In some embodiments, more than two, more than three, more than four, and so on, test types and reagent types may be pre-assigned to a particular subset of reaction vessels or pattern of reaction vessels in the receptacles 103.

Sample Carryover

In some embodiments of the invention, sample carryover is addressed. "Sample" as used herein means a liquid sample, such as whole blood, plasma, serum, red blood cell fractions, urine, cerebrospinal fluid, or other body fluids. In this example, method C (e.g., Albumin test) may be the donor method, and method D (e.g., Micro-Albumin test) may be the recipient method. $S_C$ stands for the sample of method C, $R_C$ stands for the reagent of method C, $S_D$ stands for the sample of method D, and $R_D$ stands for the reagent of method D.

When the testing apparatus (e.g., clinical analyzer) runs method C in a reaction vessel (e.g., cuvette Y), the following reaction of Eqn. 4 takes place:

$$S_C + R_C \rightarrow \text{Detection signal of product of } S_C \text{ and } R_C \qquad \text{Eqn. 4}$$

After the testing of $S_C$, the reaction vessel (e.g., cuvette Y) is cleaned and is made ready for the next test. If the next test is method D, then any residual $S_C$ in the cuvette Y may act as a sample analyte of method D, when the following reactions of Eqn. 5 take place:

$$S_D + R_D \rightarrow \text{Detection signal of product of } S_D \text{ and } R_D \qquad \text{Eqn. 5}$$

$$S_C + R_D \rightarrow \text{Detection signal of product of } S_D \text{ and } R_D \qquad \text{Eqn. 6}$$

The sum of the detection signals is then reported. Because residual $S_C$ acts as the sample analyte to method D and thus is detected as product of $S_D$ and $R_D$, a false test result from method D may be reported.

One traditional way to mitigate these two types of carryover (i.e., reagent carryover and sample carryover) has been to schedule additional or special washes. The problem is that these additional or special washes take a long time to perform and significantly reduce throughput of the testing apparatus 100.

One or more embodiments of the present invention solve the problem of reagent and/or sample carryover by scheduling the donor and recipient methods to be run in different subsets of reaction vessels. As discussed above, for example, method A may always run in a subset of reaction vessels (e.g., cuvettes) in odd numbered receptacles 103, and method B may be conducted in other reaction vessels (e.g., cuvettes) received in even numbered receptacles 103. Cross contamination from reaction vessels (e.g., cuvettes) between method A and method B is therefore mitigated. Furthermore, no additional cuvette washes or special detergents may be needed, or optionally a length of a wash may be reduced.

Accordingly, it should be recognized that in method embodiments of the invention, the donor test is provided in one group of cuvettes (e.g., first subset of reaction vessels 112), and recipient test is provided in a different group of cuvettes (e.g., second subset of reaction vessels 114). This is true for all test lots.

Benefits from the one or more embodiments of the method are:

1) There is no reagent carryover (or sample carryover) from the donor test to the recipient tests.

2) No disposable cuvettes and cuvettes loading subsystem are needed, thus system cost may be reduced.

3) Special wash routines and detergents used to mitigate the specific donor/recipient carryover test pairs may no longer be desired.

4) System throughput may be increased, thus potentially reducing cost per test.

5) There is no, or minimum, delay in processing a patient sample, thus patient results may be reported sooner.

For example, when the donor tests are pre-assigned to run in even cuvettes and the recipient test is pre-assigned to run in odd cuvettes, there are three seconds allotted per test for dispense of the sample (e.g., on an incubation member 102 with 220 cuvettes). There are only two cases to schedule the recipient test. The first case is that the immediate available cuvette is an odd cuvette and the test has been designed as being pre-assigned to an odd receptacle, then there is no delay in processing the sample. The second case is that the immediate available cuvette is an even cuvette, but the test has been pre-assigned to an odd cuvette, then there is only three seconds delay until an odd cuvette will be available to allow for dispense of the sample.

This method is not limited to the odd/even test arrangement. The two subsets of reaction vessels may be arranged in any suitable pattern that separate the donor test and recipient tests into different subsets (groups) of cuvettes, as discussed above.

Figure 3:
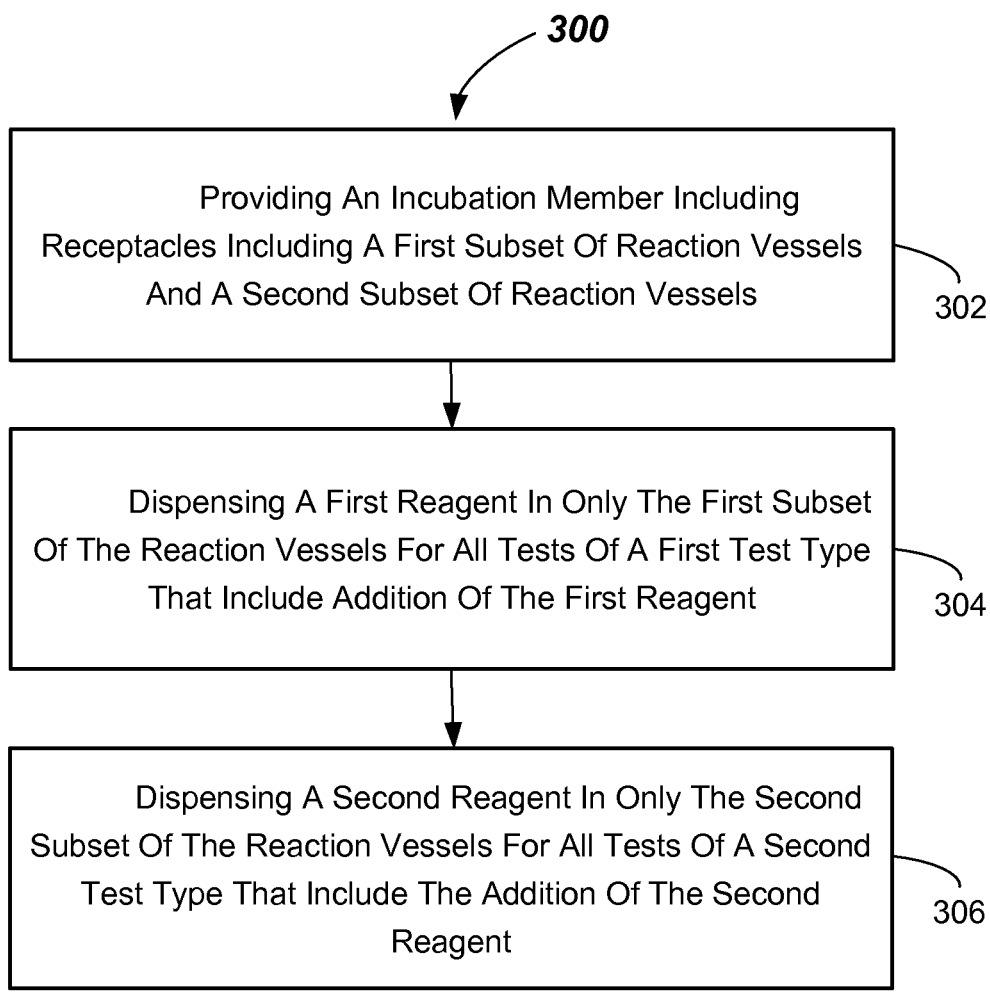
FIG. 3 illustrates a flowchart of a method a testing according to one or more embodiments.

Referring now to FIG. 3, a method of reducing carryover of reagents in analytical testing carried out in a testing apparatus (e.g., testing apparatus 100) is provided. The method 300 comprises, in 302, providing an incubation member (e.g., incubation member 102—incubation ring) including receptacles including a first subset of reaction vessels (e.g., first subset of reaction vessels 112, 212) and a second subset of reaction vessels (e.g., second subset of reaction vessels 114, 214).

The method 300 further includes dispensing a first reagent in only the first subset of the reaction vessels for all tests of a first test type that include addition of the first reagent in 304, and dispensing a second reagent in only the second subset of the reaction vessels for all tests of a second test type that include the addition of the second reagent in 306. In this manner, reagent carryover may be minimized.

Figure 4:
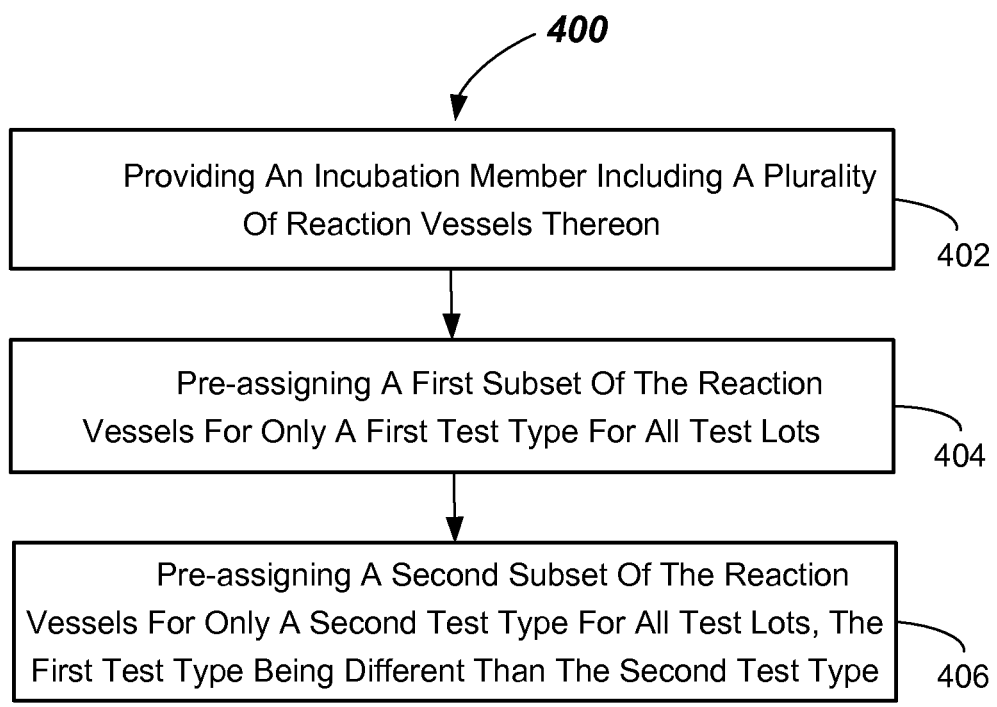
FIG. 4 illustrates a flowchart of another method a testing according to one or more embodiments.

Referring now to FIG. 4, a method of reducing carryover of liquids in analytical testing is provided. The method 400 comprises, in 402, providing an incubation member (e.g., incubation member 102) including a plurality of reaction vessels (e.g., cuvettes received in receptacles 103) thereon.

The method 400 further includes, in 404, pre-assigning a first subset of the reaction vessels (e.g., first subset of reaction vessels 112, 212) for only a first test type for all test lots; and, in 406, pre-assigning a second subset of the reaction vessels (e.g., second subset 114, 214) for only a second test type for all test lots, the first test type being different than the second test type. In this manner, liquid carryover (e.g., sample carryover) may be minimized.

While the invention is susceptible to various modifications and alternative forms, specific system and apparatus embodiments and methods thereof have been shown by way of example in the drawings and are described in detail herein. It should be understood, however, that it is not intended to limit the invention to the particular systems, apparatus, or methods disclosed but, to the contrary, the intention is to cover all modifications, equivalents, and alternatives falling within the scope of the invention.

What is claimed is:

1. A method of reducing carryover of reagents in analytical testing, comprising:

providing an incubation member including receptacles including a first subset of reaction vessels and a second subset of reaction vessels;

providing a dispensing system for dispensing reagents into the first subset of reaction vessels and into the second subset of reaction vessels;

providing a controller in communication with the dispensing system;

defining a first reagent type comprising one or more non-interfering reagents that do not act as an analyte to any tests that include reagents defined within the first reagent type;

defining a second reagent type comprising one or more non-interfering reagents that do not act as an analyte to any tests that include reagents defined within the second reagent type, the reagents included within the second reagent type acting as an analyte to any tests that include reagents defined within the first reagent type;

first reagent dispensing by the dispensing system under control of the controller of a reagent defined as the first reagent type only into reaction vessels within the first subset for tests of a first test type that include addition of the first reagent type; and second reagent dispensing by the dispensing system under control of the controller of a reagent defined as the second reagent type only into reaction vessels within the second subset for tests of a second test type that include the addition of the second reagent type;

first sample dispensing of samples into the first subset of reaction vessels and into the second subset of reaction vessels;

performing first tests of the first test type in the first subset of reaction vessels and second tests of the second test type in the second subset of reaction vessels;

second sample dispensing of samples into the first subset of reaction vessels and the second subset of reaction vessels after performing the first tests and the second tests;

third reagent dispensing of a reagent defined as the first reagent type only into the first subset of reaction vessels after performing the first tests;

fourth reagent dispensing of a reagent defined as the second reagent type only into the second subset of reaction vessels after performing the second tests; and performing tests of a third test type in the first subset of reaction vessels and performing tests of a fourth test type in the second subset of reaction vessels subsequent to the second sample dispensing.

2. The method of claim 1, comprising:

pre-assigning certain test types in accordance with a pattern of the receptacles of the incubation member.

3. A testing apparatus, comprising:

an incubation member including reaction vessels thereon;

a controller configured to execute a selection routine in order to:

pre-assign a first subset of the reaction vessels on the incubation member to carry out all tests of a first test type including a first reagent type, the first reagent type including one or more reagents that do not act as an analyte to any tests that include reagents defined within the first reagent type; and pre-assign a second subset of the reaction vessels to carry out all tests of a second test type including a second reagent type, the second reagent type-including one or more reagents that do not act as an analyte to any tests that include reagents defined within the second reagent type;

a drive system operable to move the incubation member responsive to the selection routine;

a dispensing system configured to perform first sample dispensing of samples into the first subset of the reaction vessels and the second subset of the reaction vessels, first reagent dispensing of a reagent of the first reagent type only in the first subset of the reaction vessels for tests of a first test type, second reagent dispensing of a reagent of the second reagent type only in the second subset of the reaction vessels for tests of a second test type, second sample dispensing of samples into the first subset of the reaction vessels and the second subset of the reaction vessels after tests of the first test type are performed in the first subset of the reaction vessels and tests of the second test type are performed in the second subset of the reaction vessels, third reagent dispensing of a reagent defined as the first reagent type only into the first subset of the reaction vessels for tests of a third test type, and fourth reagent dispensing of a reagent defined as the second reagent type only into the second subset of the reaction vessels for tests of a fourth type;

the controller further configured to perform tests of a third test type in the first subset of reaction vessels and perform tests of a fourth test type in the second subset of reaction vessels subsequent to the second sample dispensing; and a read device configured to read a relative concentration of a component of interest within a reaction vessel in which either the first test type or the second test type has been carried out in response to the selection routine.

4. The testing apparatus of claim 3, wherein the incubation member comprises a ring including a plurality of numbered receptacles configured to contain the reaction vessels, and wherein the first subset comprises reaction vessels in odd numbered receptacles, and the second subset comprises reaction vessels in even numbered receptacles.

5. The testing apparatus of claim 3, wherein the incubation member comprises a ring including a plurality of receptacles configured to contain the reaction vessels, the first subset comprises reaction vessels arranged in a first pattern, and the second subset comprises reaction vessels arranged in a second pattern.

6. A method of reducing carryover of reagents in analytical testing, comprising:

providing a first subset of reaction vessels and a second subset of reaction vessels;

defining a first reagent type comprising one or more non-interfering reagents that do not act as an analyte to any tests that include reagents defined within the first reagent type;

defining a second reagent type comprising one or more non-interfering reagents that do not act as an analyte to any tests that include reagents defined within the second reagent type;

first sample dispensing of samples into the first subset of reaction vessels and into the second subset of reaction vessels;

first reagent dispensing of a reagent defined as the first reagent type only into reaction vessels within the first subset; and second reagent dispensing of a reagent defined as the second reagent type only into reaction vessels within the second subset;

performing first tests of a first test type in the first subset of reaction vessels;

performing second tests of a second test type in the second subset of reaction vessels;

second sample dispensing of samples into the first subset of reaction vessels and the second subset of reaction vessels after performing the first tests and the second tests;

third reagent dispensing of a reagent defined as the first reagent type only into the first subset of reaction vessels after performing the first tests;

fourth reagent dispensing of a reagent defined as the second reagent type only into the second subset of reaction vessels after performing the second tests; and performing third tests of a third test type in the first subset of reaction vessels and performing fourth tests of a fourth test type in the second subset of reaction vessels subsequent to the second sample dispensing.

\* \* \* \* \*